Dec. 31, 1963  C. J. DRY ETAL  3,115,945
CHASSIS SUPPORT APPARATUS AND SYSTEM
Original Filed Nov. 21, 1960  2 Sheets-Sheet 1
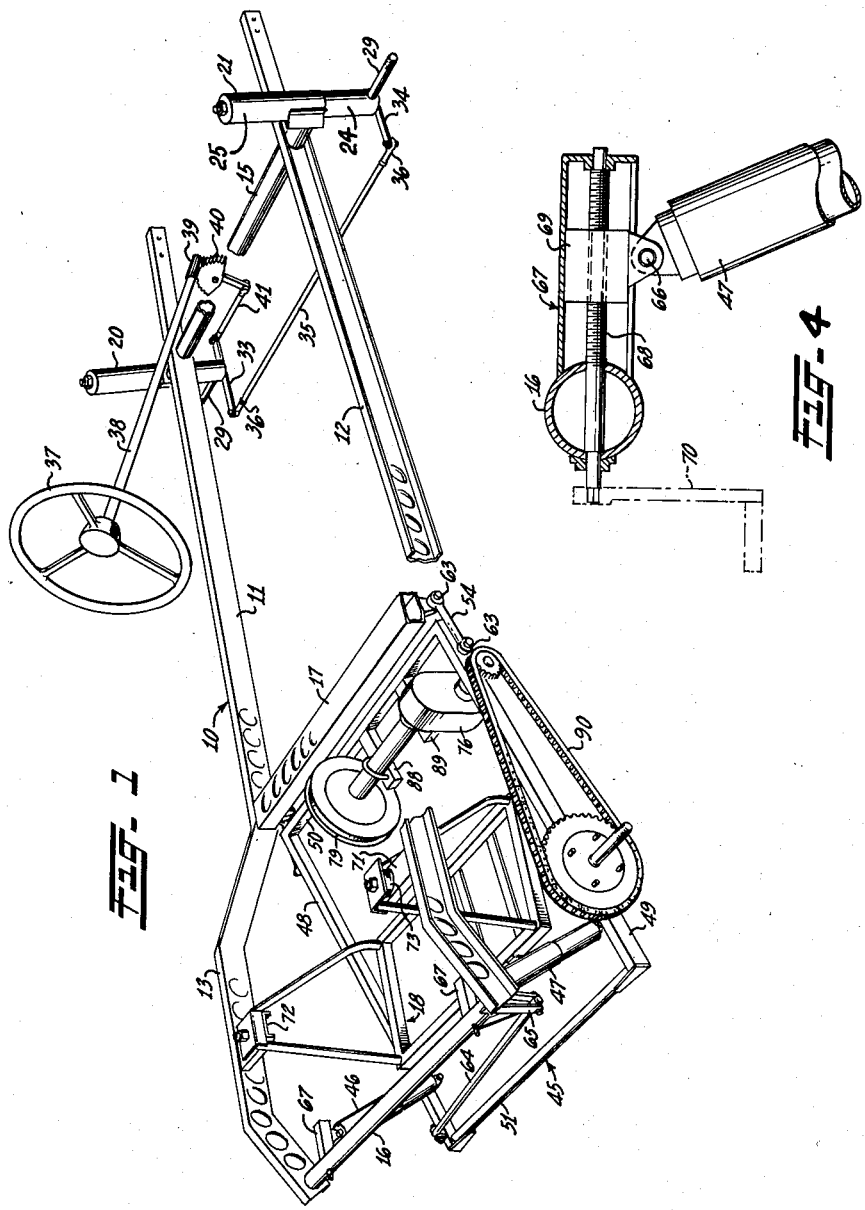
INVENTORS:
CLAUD J. DRY
DALE C. ORCUTT
BY
Mellin and Hanscom
ATTORNEYS Dec. 31, 1963  C. J. DRY ETAL  3,115,945
CHASSIS SUPPORT APPARATUS AND SYSTEM
Original Filed Nov. 21, 1960  2 Sheets-Sheet 2
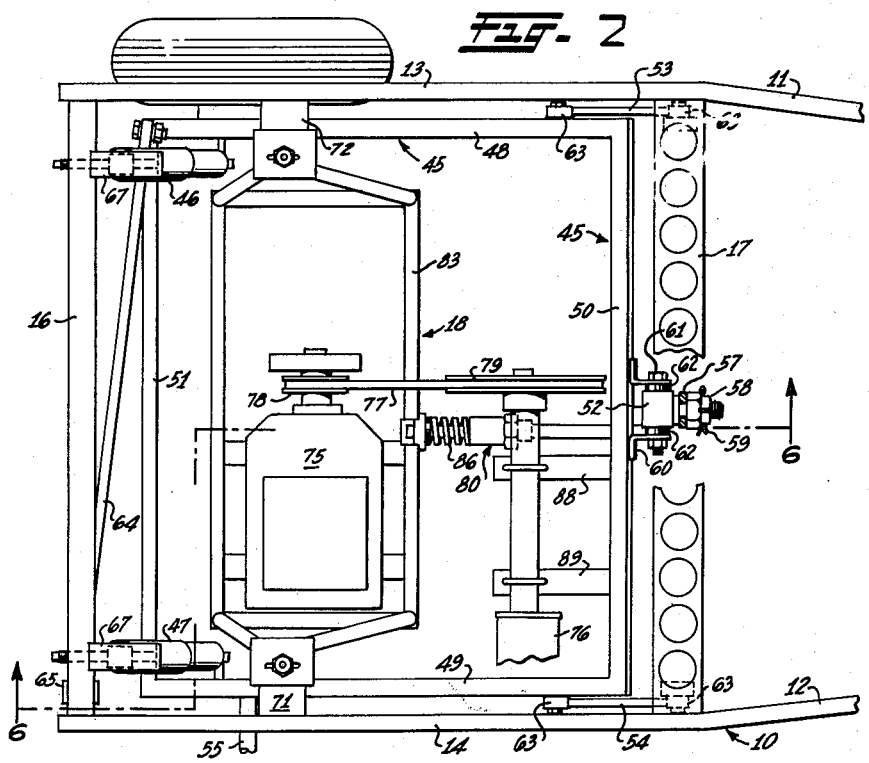
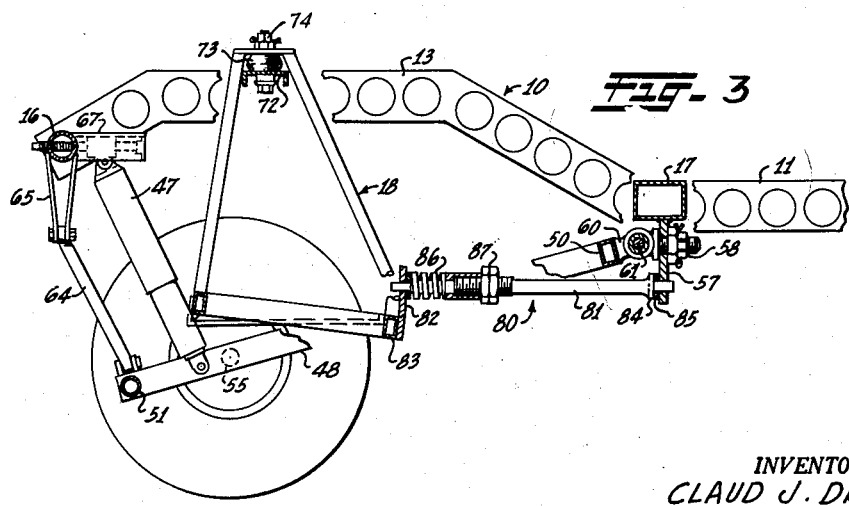
INVENTORS:
CLAUD J. DRY
DALE C. ORCUTT
BY
Mellin and Hanscom
ATTORNEYS

United States Patent Office 3,115,945
Patented Dec. 31, 1963

3,115,945
CHASSIS SUPPORT APPARATUS AND SYSTEM
Claud J. Dry, 76 S. Shannon Ave., and Dale C. Orcutt, 291 E. State St., both of Athens, Ohio
Original application Nov. 21, 1960, Ser. No. 70,788. Divided and this application Dec. 11, 1961, Ser. No. 158,401
2 Claims. (Cl. 180—56)

This invention relates to chassis support systems and more particularly involves improvements in apparatus for supporting a chassis main frame and a motor mounting frame upon wheel axles.

This application is a division of our parent application, Serial No. 70,788, filed November 21, 1960, and entitled "Chassis Support Apparatus and System."

In brief, the invention comprises front and rear support apparatus for a main chassis frame. The front support includes a pair of cushion cylinders having telescoping inner and outer tubular members and a resilient means urging them apart. One tubular member of each pair is provided with a wheel axle, and these tubular members are interconnected by a linkage for producing simultaneous and equivalent turning movement. The other tubular member of each cushion cylinder is rigidly mounted to the main frame by means allowing the camber and caster of each front wheel axle to be independently adjusted. It will become further apparent that the front support mechanism can be steered through a rotatable steering shaft and a motion translating means that connects to one of the axle supporting tubular members.

The rear support comprises a support frame that is pivotally mounted to the main frame and is provided with wheel support axles on either side. A second pair of cushion cylinders, each having inner and outer telescoping tubular members and biasing means urging them apart, are disposed between the non-pivotally mounted or free end of said support frame and the main frame, thereby resiliently supporting the rear end of the main frame. The mounting connections which secure the cushion cylinders to said main frame incorporate an adjusting device that allows said cylinders to be positioned more or less vertically, whereby said support mechanism can be regulated for heavy or light loads.

Another aspect of the rear support is in providing a motor mount assembly that is pendantly supported from the main frame in close proximate relation to the rear support axles. A drive motor may be mounted upon said motor frame and connected by a flexible drive connection to a pulley drum that is mounted upon the rear support frame. The flexible drive connection is then made taut by a tensioning means that biases the motor frame away from said pulley drum.

It will be recognized particularly in view of the following detailed description that one object of this invention is to provide a relatively simple, yet highly effective support apparatus and system for a wheeled vehicle.

It is a further object of this invention to provide a chassis support apparatus for a main frame that includes a support frame pivotally mounted to said main frame upon a horizontal and transverse axis, a pair of coaxial wheel axles mounted laterally from said support frame, the axes of said axles being substantially parallel to said horizontal and transverse axis, and a pair of cushion cylinders mounted upon opposite sides of said main frame, each cushion cylinder having a pair of telescoping inner and outer tubular members and resilient means urging them apart, one tubular member of each pair being pivotally connected to said main frame upon a horizontal axis, the other tubular member of each pair being pivotally mounted to said support frame upon a horizontal axis.

A further object is to provide a chassis support apparatus including a support frame for a main frame, and having a pair of cushion cylinders that are pivotally mounted therebetween by means that may be adjusted to position the cushion cylinders more and less vertically, whereby said support apparatus can be adjusted for heavy or light loads.

A still further object of the invention is to provide a chassis support and motor mount assembly that includes a motor support frame pendantly mounted from a main chassis frame and a flexible drive connection between a motor and pulley drive transmission, and whereby said flexible drive connection is made taut by a tensioning means that applies a biasing force between the motor support frame and the main chassis frame.

Other objects of this invention will become apparent in the course of the following detailed description.

In the drawings forming a part of this application, and in which like parts are designated by like reference numerals throughout the same, FIG. 1 is a perspective view of a main chassis frame for a wheeled vehicle and illustrates a preferred embodiment of a suspension system constructed in accordance with this invention;

FIG. 2 is a plan view of the rear suspension system for the main chassis frame;

FIG. 3 is a vertical section taken on the broken lines 3—3 of FIG. 2; and

FIG. 4 is an enlarged detail view of the rear suspension adjusting mechanism shown in FIG. 3.

Referring more particularly to FIG. 1 of the drawings, there is shown a welded chassis frame construction 10 for a wheeled vehicle. The chassis frame is comprised of front side channels 11 and 12, rear elevated side channels 13 and 14, transverse tubular front and rear end connectors 15 and 16, and an intermediate transverse support 17. This invention, however, is more especially directed to the system and apparatus for resiliently supporting the chassis frame 10 and a motor mount frame 18 upon wheels.

The front end of chassis frame 10 is supported upon a pair of cushion cylinders 20 and 21, mounted upon the projected extensions of tubular front connector 15.

Cushion cylinders 20 and 21 are comprised of telescoping inner and outer tubular members 24 and 25, respectively, said members being urged apart by a helical spring of the type shown in our above mentioned copending application Serial No. 70,788. An axle shaft 29 projects through member 24 and is rigidly welded thereto.

Referring again to FIG. 1, the lower tubular members of each cushion cylinder are interconnected by a linkage for producing simultaneous turning movement. This linkage connection includes a pair of pitman arms 33 and 34, respectively welded or otherwise mounted to the bottoms of cushion cylinders 20 and 21. Arms 33 and 34 are interconnected by a tie rod 35, and the connections 36 are preferably adjustable to control or regulate the toe-in of the axle shafts 29.

The axle shafts may be controlled by a steering mechanism including a conventional steering wheel 37 and shaft 38. A positive turning action is transmitted from wheel 37 to the extended end of pitman 33 by a motion translating means comprising a pinion 39, an arcuate gear 40, and a linkage connection 41.

The rear end of chassis frame 10 is resiliently supported upon a lower support frame 45 by an independent rear spring and shock support including cushion cylinders 46 and 47. Frame 45 is generally defined by lateral members 48 and 49 and transverse members 50 and 51, and said frame is pivotally connected to frame 10 upon a pintle 52 and lateral stabilizing bars 53 and 54. A pair of rear axle shafts 55, as shown, extend laterally outward from frame 45, but a continuous rear axle housing with spindle may be mounted upon the frame instead.

Pintle 52 interconnects transverse member 50 with intermediate transverse support 17, as best shown in FIGS. 2 and 3. The pintle is rotatably secured to a depending support 57 in a longitudinal direction by means of a nut 58 and a cotter pin 59. Member 50 is provided with a bracket 60 having spaced ears between which a sleeve portion of pintle 52 is confined and mounted upon a through bolt 61, said sleeve having an axis normal to the pintle's mounting. Rubber bushings 62 are employed between the ends of the pintle sleeve and the spaced ears of bracket 60. Accordingly, the pintle connection will allow frames 10 and 45 to pivot with respect to a longitudinal axis and also with respect to a normal axis, said normal axis being in a horizontal plane for most conditions of road travel.

Stabilizer bars 53 and 54 are pivotally connected between transverse support 17 and lateral members 48 and 49, respectively. Rubber bushings 63 are provided at each pivotal connection and allow the bars to work up and down as frame 45 is pivoted relative to frame 10. However, the stabilizer bars will tend to inhibit lateral sway between said frames as well as pivotal movement upon the longitudinal axis of pintle 52. A sway bar 64 is also provided between lateral member 48 and a depending support 65 mounted to frame 10. Conventional rubber bushing members 63 are provided at each pivot juncture to reduce shock and noise.

Cushion cylinders 46 and 47 are substantially similar to cylinders 20 and 21, which have been previously described, and both include telescoping inner and outer tubular members having a resilient biasing means urging them apart, such as a coiled helical spring member. However, cylinders 46 and 47 are pivotally mounted at their ends to frames 10 and 45, and more particularly interconnect transverse member 16 and lateral members 48 and 49 upon an incline. The connection between cylinders 46 and 47 and transverse member 16 allows the pivot points 66 to be shifted forward or backward, thereby positioning said cylinders more or less vertically. It will be understood that where the cylinders are placed in a more vertical position, as by moving the pivot points 66 forwardly, as shown, the effective biasing force of the cushion cylinders will be directed more oppositely to a supported load. As a consequence, the cushion cylinders will be able to support heavier loads upon frame 45 when the pivot points are in a forward position. However, for a softer and more comfortable ride the pivot points 66 should be moved rearwardly, for the greater angle of incline will produce a greater telescoping of the cushion cylinders to support the same impact load.

The means whereby pivot points 66 can be adjusted comprises a pair of screw devices 67 mounted rigidly upon transverse member 16 of frame 10. Each screw device provides a threaded shaft 68 mounted in bearings and having a movable pivot block 69 threadedly engaged with said shaft. The shaft 68 may be rotated manually by a crank 70, as shown in FIG. 7, but it is fully realized and contemplated that a powered drive might be incorporated. Of course, other types of devices might also be employed for adjusting the position of a pivot block, as for example, a fluid actuated cylinder or even adjustable linkages.

Motor mount frame 18 is pendantly supported from main chassis frame 10 upon side mounting plates 71 and 72. Heavy rubber bushings 73 are disposed between said plates and the frame, and a pair of through bolt connections 74 complete the frame mounting assembly.

Power plant 75 is mounted upon frame 18 and is connected to a transmission 76 by a flexible connecting means such as a V-belt 77 and pulley drums 78 and 79. It will be understood that this pulley drive connection will tend to pivot frame 18 in a counterclockwise direction toward the transmission, as shown, in FIG. 1. However, a tensioning device 80 urges frame 18 away from said transmission, thereby applying a constant tension on the flexible connecting means.

Tensioning device 80 comprises a rod member 81 having ends which project through openings in support member 57 and a support plate 82 attached to transverse member 83 of frame 18. One end of rod 81 is provided with an enlargement 84 that will seat against member 57, and a resilient pad or washer 85 is disposed therebetween. The opposite end of rod 81 is free to be reciprocated in its support opening, but a coiled spring 86 bears against plate 82 and an adjustable footing 87 that is formed intermediate the ends of rod 81. It will be seen that spring 86 will urge the motor frame 18 away from the pulley 79, thereby applying a tension upon the V-belt connection 77.

Transmission 76 is supported upon a pair of arms 88 and 89 that are a part of support frame 45. The drive shaft of transmission 76 is supported from lateral member 49 and drives one wheel by means of a chain drive 90, including a sprocket upon a rear axle shaft 55.

It is to be understood that while a preferred form of this invention is illustrated and described, various changes may be made without departing from the spirit of the invention or the scope of the attached claims, and each of such changes is contemplated.

Having thus described our invention, what we claim and desire to obtain by Letters Patent is:

1. A chassis support apparatus comprising: a main frame, a support frame pivotally mounted from said main frame upon a horizontal and transverse axis, a pair of wheel axle shafts mounted laterally from said support frame, the axes of said axle shafts being substantially parallel to said horizontal and transverse axis, a pair of cushion cylinders mounted upon opposite sides of said main frame, each cushion cylinder having a pair of telescoping inner and outer tubular members and resilient means urging them apart, one tubular member of each pair being pivotally connected to said main frame upon a horizontal axis, the other tubular member of each pair being pivotally mounted to said support frame upon a horizontal axis; a motor mount frame pendantly supported from said main frame, a motor mounted upon said motor mount frame, a belt driven gear transmission mounted upon said support frame, a belt connection extending between said motor and said transmission, said connection tending to pivot said motor mount frame about its pendant support, means for urging said motor and pulley drive apart and applying a tension on said belt connection, a wheel sprocket mounted upon one of said wheel axle shafts, and means including a belt connection intermediate said gear transmission and said wheel sprocket.

2. The chassis support of claim 1 including means for adjustably mounting said one tubular member to said main frame, said means allowing said cushion cylinders to be positioned more and less vertically, whereby said support apparatus can be adjusted for heavy or light loads.

References Cited in the file of this patent

UNITED STATES PATENTS

| | | |
|---|---|---|
| 494,641 | Maybach | Apr. 4, 1893 |
| 746,610 | Waddell et al. | Dec. 8, 1903 |
| 1,344,945 | Hartmann | June 29, 1920 |
| 1,344,946 | Hartmann | June 29, 1920 |
| 1,466,817 | Dixon | Sept. 4, 1923 |
| 1,802,485 | Smith et al. | Apr. 28, 1931 |
| 2,285,954 | Wahlberg | June 9, 1942 |
| 2,692,778 | Stump | Oct. 26, 1954 |

FOREIGN PATENTS

| | | |
|---|---|---|
| 865,320 | France | Feb. 17, 1941 |